Jan. 10, 1956 E. T. KINDT, SR., ET AL 2,730,477
WAX PRODUCT
Filed Aug. 17, 1955
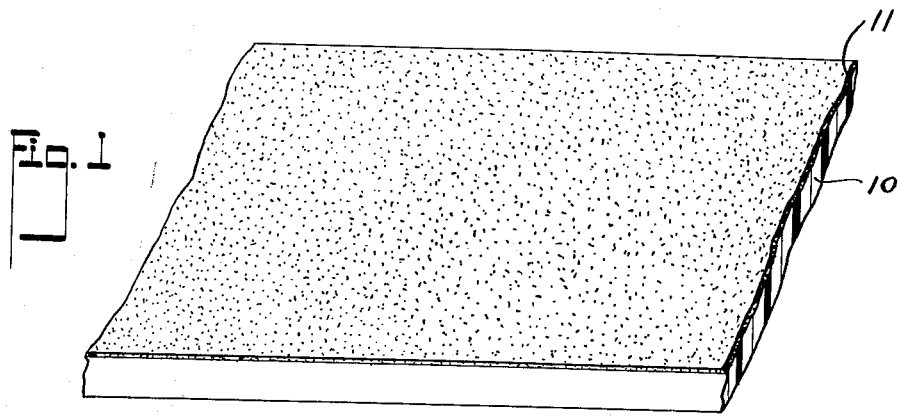
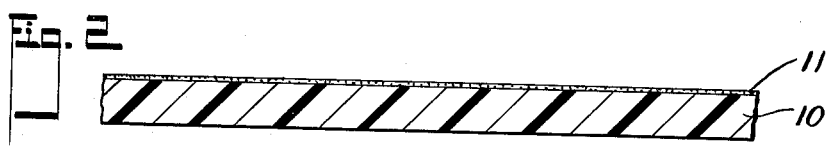
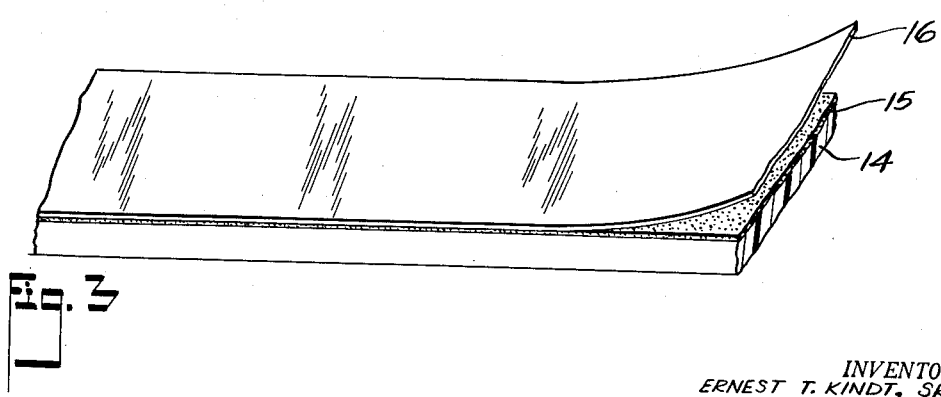
INVENTORS
ERNEST T. KINDT, SR.
DAVID T. KINDT
BY & WILLIAM SIEGFRIED
RICHEY, WATTS, EDGERTON & McNENNY
ATTORNEYS

United States Patent Office 2,730,477
Patented Jan. 10, 1956

2,730,477
WAX PRODUCT

Ernest T. Kindt, Sr., and David T. Kindt, Lakewood, and William Siegfried, Parma Heights, Ohio, assignors to The Kindt-Collins Company, Cleveland, Ohio, a corporation of Ohio Application August 17, 1955, Serial No. 528,916

9 Claims. (Cl. 154—53.5)

The present invention relates generally to the pattern-making art and is more particularly concerned with a novel wax composition having special utility in mold making and in the manufacture of molded dies, and with an unique wax article for use in these operations.

Although the mold-making art is old and crowded, there are certain serious limitations and disadvantages which persist in the best practice despite all prior efforts to eliminate or relieve them. One problem of special importance concerns the matter of part thickness. For lack of a suitable material, it has been difficult to establish within close limits in molds the space corresponding to the thickness of the article to be molded. A related problem concerns the building up of patterns where it is desired to increase or decrease the thickness of the final molded product or parts thereof. Compensating for shrinkage in the molding operation has also been difficult, if not impossible, in most cases to obtain in molding operations.

In accordance with the present invention, these classical problems of the art can now be solved, and the foregoing difficulties can be avoided. Moreover, these new results and advantages can be realized without any offsetting disadvantage, economic or otherwise.

In addition to these advantages, the wax product of this invention may be integrated with a pattern for purposes of adjusting the pattern shape or for altering the shape of the finished metal article to be produced therein. These results, as well as those outlined above, can be obtained through the use of this new product of this invention without requiring any special skill beyond the skill of the ordinary pattern maker or the mold maker, and the work leading to these results can be carried out more rapidly and easily by the journeyman in the art than can the corresponding heretofore conventional practices.

The present invention has additional important new results and advantages. In particular, in those arts such as jewelry manufacturing and the dental field where the lost-wax process is employed to produce precision castings, there now, for the first time, is by virtue of this invention a wax-like material having a hitherto unobtainable combination of physical properties and characteristics making it ideal in essentially all respects for use in those lines. Where all materials of this type previously known have been deficient in one or more respects and the lost-wax process has accordingly been one of compromise between shortcomings, a material which is ideal in all respects is now provided. Waxes for use in the lost-wax process should have the ability to adhere well to the ordinary investment materials. Furthermore, they should not require warming or other special treatments in order to establish their adherence because of the difficulty of controlling these operations. These waxes should also have superior carving characteristics and they should be relatively soft and yet shape maintaining. Still another essential feature of these waxes is flexibility, but it must be coupled with non-resiliency so that the wax once formed will not tend to return to its original shape. Obviously these waxes must also flow completely from the mold cavity when the mold is fired so as to leave a clean, smooth cavity to receive cast metal and thereby produce a faithful product.

The wax products of this invention satisfy all the foregoing requirements for materials to be used in the lost-wax process and for mold-making materials in general, and they hold additional advantages of importance. Thus, for example, wax composites of this invention have adhesive characteristics which are retained for protracted periods under conditions of storage. Furthermore, the articles of the present invention may be provided in such form that their adhesive characteristics do not impair their handling, and their ultimate utility and value are not diminished by such handling. Additionally, the products of this invention require no special pre-heating or other treatment in their use, but are usable immediately and directly upon withdrawal from storage. As a further important advantage of this invention, the composite or combination form of the invention may be provided in the form of separate elements or units for assembly or combination just prior to the time of use without loss of any of the foregoing advantages or incurring any offsetting disadvantage.

Another advantage of this invention is that it affords a new and valuable tool for the dressing of wounds. Hydrocarbon waxes are inherently sterile and non-toxic; and, by virtue of the fact that they are impervious to chemical attack and degeneration by body fluids and secretions, they may be applied to wounds to maintain an antiseptic condition or even to provide a disinfecting result. By treating such wax dressing materials in accordance with this invention, they may be applied directly and quickly to the wound to be held firmly and securely in place over protracted periods corresponding to the length of time that heretofore conventional types of dressings are usually applied. No additional means is required either to attach these dressings to the affected area and nothing is required to hold them in place as long as desired, and they may be made to any size and shape specifications to simplify and accelerate bandaging tasks. Accordingly, they also offer special new advantages in the first aid field.

In general, a wax composite article of this invention comprises a body of wax and a pressure-sensitive adhesive for engagement with a surface to fasten the wax body in predetermined position against a supporting structure, the pressure-sensitive adhesive being in the form of a film or layer which is disposed superficially on a portion of the wax body and the wax body being substantially impervious to the adhesive and having other surface portions and interior portions which are substantially free from the adhesive. Preferably this article, or at least the major portion thereof, will be completely fusible at temperatures substantially above room temperature and below about 400° F.

A novel wax composition of this invention specially suited for use in compounding of this article in general consists essentially of two micro-crystalline substances blended together in certain ratio to each other. Thus, between about 30 parts and about 70 parts of a first micro-crystalline wax are mixed together with between about 70 parts and about 30 parts, respectively, of a second micro-crystalline wax. The first wax is one presently commercially available having a melting point temperature of about 150° F., a penetration factor of 21 at 77° F., a color factor of 3, a 570° F. flash point and a viscosity factor at 210° F. of 82. The second wax, also presently available on the market, is one having a melting point temperature of about 181° F., a penetration factor of 11 at 77° F., a color factor of 1¾ and a viscosity factor of 73 at 210° F.

In the blending or compounding of this novel wax composition of this invention, any suitable procedure known for this general purpose in the art may be used with satisfactory results. In accordance with many preferences, however, the two wax substances are melted and mixed in the liquid state. When the mixing operation is completed, the resulting wax composition is cast into the physical form and shape desired for its ultimate use. Alternatively, the wax may be cast in any convenient form and subsequently rolled, extruded or otherwise processed for conversion into the form in which it is ultimately to be used, such as sheets or films.

Those skilled in the art will gain a further and better understanding of this invention upon consideration of the drawings accompanying and forming a part of this specification, in which:

Fig. 1 is a fragmentary, perspective view of an article embodying this invention in a preferred form;

Fig. 2 is a view in cross-section of the article of Fig. 1, showing pressure-sensitive adhesive material as a superficial layer on the upper surface of a wax body;

Fig. 3 is a fragmentary, perspective view of an article of this invention, showing a wax sheet provided with a superficial layer of pressure-sensitive adhesive and a mask for the adhesive coating.

As illustrated in these drawings, the present invention is practiced by the application in any suitable manner of a relatively small quantity of a pressure-sensitive adhesive substance to the surface of a body of wax, the wax and the adhesive substance being selected with regard to the characteristics of each as described above in order to produce the novel results and advantages of this invention. Thus, as shown in Figs. 1 and 2, a sheet of wax 10 is coated with a relatively thin film of pressure-sensitive adhesive material to produce a superficial coating 11 of the said adhesive on one side or surface of the wax sheet. Spraying, dipping, brushing and similar techniques may be employed to produce this novel combination of wax and adhesive, the critical consideration being the control of conditions during the application step in order that there will be no tendency for the adhesive to penetrate the wax sheet and in order that there will be no weakening of the bond between the adhesive and the article to impair the utility of the resulting article. The choice of solvents, the temperatures of the adhesive and the wax when they are brought together, and the manner in which the coating is created are all of importance from the standpoint of the nature of the final product. It is possible, through lack of control along any of these lines, to preclude the realization of the advantages of this invention, even though the original choice of wax and adhesive was correct and in accordance with the discoveries underlying the present invention.

The Fig. 3 article of this invention comprises a wax sheet 14 provided on its upper side with a coating of substantially uniform thickness of pressure-sensitive adhesive material 15 and a mask 16 of suitable cellulosic material or the like. In accordance with our preferred practice of this invention, the adhesive coating will be quite thin compared to the wax body, even where the wax is in the form of a sheet, and the mask will likewise be as thin as possible.

In the practice of this invention, we have found that consistently satisfactory results are obtained when a pressure-sensitive adhesive of the water-emulsion type is used with a wax having little or no affinity for water, such as a hydrocarbon wax. Preferably, the adhesive and wax, or wax blend, are selected as to temperature characteristics so that the step of applying the adhesive to the wax can be carried out without a preliminary heating or cooling operation. Room temperature is our ideal operating condition, and we use this term in the broadest sense to mean and include any temperature in the range between about 50° F. and about 120° F.

The adhesive which we presently prefer for use in the commercial production of the novel products of this invention is of the water-emulsion type containing dispersed iso-butylene polymers, neoprene and tackifying resins in water as a medium or vehicle. This adhesive is available on the market at present as a product of the B. B. Chemical Company, Cambridge, Massachusetts, under the title "Bostik 601." When an aqueous-base adhesive of this kind is used, as indicated above, any hydrocarbon wax which otherwise qualifies for use in accordance with this invention can be employed. In addition, there are a large number and variety of blends of waxes which are suitable for use with these adhesives and some natural waxes and natural wax-base wax blends can also be used. The criterion is the degree of compatibility of the wax or wax blend with the adhesive and especially the vehicle, in this case water.

As a general proposition, waxes are not soluble in or compatible with polar solvents, but are compatible with non-polar solvents and in some instances are readily dissolved thereby. However, as those skilled in the chemical art realize, there are zones of gray in varying shades between the white and black extremes, and it is possible to find exceptions to the general rule to the extent that a polar solvent will penetrate a given wax sufficiently to defeat the objects of this invention. Accordingly, it will be understood that the waxes and wax blends and the adhesives employed in the preparation of the products of this invention as set out in the appended claims are those which exhibit no tendency toward compatibility so that there is no significant penetration or bleeding of adhesive or adhesive solvent into the wax body to which the adhesive is applied.

The following illustrative, but not limiting, examples of the practice of the present invention are offered to further inform those skilled in the art of the nature and character of the ingredients and procedures involved in the preparation of the novel products defined in the appended claims:

EXAMPLE I

A blend of hydrocarbon waxes was prepared by melting a wax having a melting point of 181° F. and a penetration factor of 11, a wax having a melting point of 150° F. and a penetration factor of 21, and a wax having a melting point of 150° F. to 160° F. and a penetration factor of 60 to 80, and pouring these together and mixing them thoroughly in the ratio of four parts of each of the first two and two parts of the third one. This blend was cast into heavy sheet form of approximately twice the final desired thickness and reduced by rolling in two stages. Bostik 601 was applied to one surface of the finished sheet by means of a brush, the adhesive and sheet being at room temperature, i. e., about 70° F. The resulting product was then ready for immediate use or for slip sheeting in accordance with the practice in the art.

EXAMPLE II

A blend of waxes was prepared in accordance with the procedure outlined in Example I using 5 parts of beeswax, 2 parts of carnauba wax, 2 parts of ceresin wax and one part of paraffin wax having a melting point temperature between about 138° F. and about 140° F. This blend was cast in the pigs; and after cooling and solidifying was extruded into sheet form. Pressure-sensitive adhesive (Bostik 601) was applied to one side of the sheet material by means of a sprayer, the adhesive, the sheet and the ambient atmosphere being at about 70° F. throughout the spraying period. When the application of the adhesive to the sheet surface was complete and the adhesive coating of uniform thickness approximating 0.01 inch was established, the adhesive was permitted to dry in room temperature air for thirty minutes. The resulting article was then ready for slip sheeting or for use directly.

EXAMPLE III

Another wax blend was prepared in accordance with the procedure of Example I using 30 parts of paraffin wax having a melting point temperature of 151° F. and a penetration factor of 9, 10 parts of paraffin wax having a melting point temperature of 128° F. to 130° F., 35 parts of hydrocarbon wax having a melting point temperature between 150° F. and 160° F., a penetration factor of 60 to 80, and 25 parts of hydrocarbon wax having a melting point temperature of 150° F. and a penetration factor of 21. This blend was cast into sheet form and rolled in two stages to the desired uniform thickness and then cut to size for use as surgical dressings. To one side of each of the dressing sheets, a pressure-sensitive adhesive (Bostik 601) was applied by brushing to establish a pattern of adhesive around the wound area and a central surface free from adhesive to overlie the wound to be covered by the dressing sheet. The application of the adhesive was carried out under room temperature circumstances, i. e. about 70° F.; and, following the application of the adhesive, the establishment of an adhesive layer of approximately 0.05 inch uniform thickness, the dressing sheets were permitted to dry for about fifteen minutes after which time they were slip sheeted and packaged for shipment and use.

EXAMPLE IV

A beeswax base blend containing approximately 50 parts beeswax, 20 parts of paraffin wax of melting point temperature between 138° F. and 140° F. and 30 parts of a hydrocarbon wax having a melting point temperature of 181° F. and a penetration factor of 11 was prepared by the same general procedure set out in Example I above. The blend was converted into sheet form by a casting and extrusion operation, as described in Example II. The resulting sheets were coated on one side to a uniform thickness of about 0.03 inch by a brushing technique employing a pressure-sensitive adhesive (Bostik 601). The adhesive was applied to the wax under relatively elevated temperature circumstances in the upper portion of the aforesaid "room temperature" range, i. e. at about 115° F., the wax, adhesive and ambient atmosphere all being of approximately the same temperature. The resulting sheets were slip sheeted and stored under room temperature conditions in open shipping cartons for a period of six months, at which time they were removed and tested and found to possess excellent adherence characteristics. It was also noted that the adhesive material had not penetrated the wax sheets to any detectable degree, and that there was no bleeding of any kind evident in the sheets, so that the adhesive material was restricted to those areas of the sheet surface where it was originally applied.

EXAMPLE V

Employing the procedure described in Example I, a wax blend was prepared using 70 parts of a micro-crystalline hydrocarbon wax having a melting point temperature of 155° F. to 165° F. and a penetration factor of 25 to 35, about 24 parts of a hydrocarbon wax having a melting point temperature of 170° F. and a penetration factor of 15 to 20, and about 7 parts of synthetic carnauba substitute wax having a melting point temperature of about 190° F. This blend was cast from the molten state and cooled and then extruded in sheet form. Portions of the top and bottom surfaces of the sheets were brushed with with pressure-sensitive adhesive (Bostik 601) under room temperature conditions, i. e. about 50° F. and then were slip sheeted on both sides and stored for twelve months in open shipping boxes in an unheated warehouse in Cleveland, Ohio. On removal of these sheets from the cartons and stripping of the slip sheets therefrom, it was found that these sheets had retained the full effectiveness of the pressure-sensitive adhesive and were in excellent condition for use, and that there had been no detectable bleeding of adhesive into the wax sheets.

In the foregoing examples, the melting point data were given on the basis of determinations made in accordance with ASTM D127–49. Likewise, the penetration factor in each instance was given in accordance with a determination made under the method set out in ASTM D5–25, a uniform temperature of 77° F. being established for these determinations in all cases.

The manner in which the adhesive is applied to the surface of the wax article will depend largely upon the operator's preference so long as such factors as volatility of the adhesive vehicle and viscosity of the adhesive are not unusually high or low at the temperature that prevails during the application step. Thus a relatively thick adhesive composition may not be readily applied by a brush, but may serve well as a dipping bath. Likewise, an adhesive which is quick-drying may be applied to better advantage by a sprayer than by a dipping technique.

Examples of pressure-sensitive adhesives which are suitable for use in accordance with this invention to produce the novel articles described by the appended claims are as follows:

Formula A

| | Parts by weight |
|---|---|
| Polyvinylchloride-vinyl acetate copolymer | 10 |
| Hycar | 10 |
| Methyl ethyl ketone | 80 |

Formula B

| | Parts by weight |
|---|---|
| Nitrocellulose | 35 |
| Triphenyl phosphate | 25 |
| Flexalyl–G (Hercules-glycol ester of wood resin) | 45 |
| Acetone sufficient to dissolve moisture. | |

Other pressure-sensitive adhesive compositions which may be employed in the preparation of the novel products of our present invention are disclosed in the following United States patents: Re. 19,128, 2,236,527, 2,236,567, 2,285,458 and 2,386,696.

In many of the adhesives set out in these patents, non-polar solvents such as benzol, heptane and high-test gasoline are specified and these are used, according to the patentees' directions, in substantial to very large proportions in the compounding of their adhesives. It may, therefore, appear to be inconsistent to include these adhesives among those suitable for use in this invention in view of the earlier discussion herein regarding wax-solvent and wax-adhesive compatibility. However, by selecting the solvent and the method of application of the adhesive to the wax in such a way that solvent-wax contact is limited in time, penetration of the wax body by the solvent body beyond a negligible degree can be prevented. Thus, even where large quantities of heptane are used, as directed in U. S. Patent 2,236,527, evaporation of the solvent is so rapid under the temperature circumstances of application of the adhesive to the wax body, as described above, that no detectable penetration of the wax body by the heptane occurs. Furthermore, this result is obtained whether the application is by spraying, brushing or dipping techniques. However, it is generally advisable to exercise care in the selection of solvents and adhesives as to the viscosity when the application is to be made by dipping. More viscous adhesive compositions can successfully be used in spraying operations or even in brushing or roller coating.

This case is a continuation-in-part of Serial No. 504,148, filed April 27, 1955, now abandoned.

Having thus described the present invention so that others skilled in the art may be able to understand and practice the same, we state that what we desire to secure by Letters Patent is defined in what is claimed.

What is claimed is:

1. A relatively soft, readily-carved, shape-maintaining, flexible and substantially non-resilient article of manufacture which comprises a non-fibrous body of wax and a pressure-sensitive adhesive for engagement with a surface to fasten the body in predetermined position against a supporting structure, said pressure-sensitive adhesive being in the form of a film disposed superficially on a portion of said wax body, and said wax body being substantially impervious to said adhesive and having other surface portions and interior portions substantially free from said adhesive.

2. A relatively soft, readily-carved, shape-maintaining, flexible and substantially non-resilient article of manufacture which is completely fusible at temperatures substantially above room temperature and below about 400° F. and which comprises a non-fibrous body of wax and a pressure-sensitive adhesive for engagement with a surface to fasten the body in predetermined position against a supporting structure, said pressure-sensitive adhesive being in the form of a film disposed superficially on a portion of said wax body, and said wax body being substantially impervious to said adhesive and having other surface portions and interior portions substantially free from said adhesive.

3. A relatively soft, readily-carved, shape-maintaining, flexible and substantially non-resilient article of manufacture which comprises a non-fibrous body of wax and a non-setting, pressure-sensitive adhesive for engagement with a surface to fasten the body in predetermined position against a supporting structure, and a thin layer of flexible material overlying the adhesive and serving as a temporary mask for the assembly, said pressure-sensitive adhesive being in the form of a film disposed superficially on a portion of said wax body, and said wax body being substantially impervious to said adhesive and having other surface portions and interior portions substantially free from said adhesive.

4. A relatively soft, readily-carved, shape-maintaining, flexible and substantially non-resilient article of manufacture which comprises a non-fibrous sheet of wax and a film of pressure-sensitive adhesive on one side of the wax sheet for engagement with a surface to fasten the sheet in predetermined position against a supporting structure, said pressure-sensitive adhesive film being disposed superficially on the surface of the wax sheet, and said sheet having other surface portions and interior portions substantially free from said adhesive.

5. A relatively soft, readily-carved, shape-maintaining, flexible and substantially non-resilient article of manufacture the major portion of which is completely fusible at temperatures substantially above room temperature and below about 400° F. and which comprises a non-fibrous sheet of wax and a film of pressure-sensitive adhesive on only one side of the wax sheet for engagement with a surface to fasten the sheet in predetermined position against a supporting structure, and a thin layer of flexible, paper-like material overlying the adhesive and serving as a temporary mask for the assembly, said pressure-sensitive adhesive film being disposed superficially on the surface of the wax sheet, and said sheet having other surface portions and interior portions substantially free from said adhesive.

6. A relatively soft, readily-carved, shape-maintaining, flexible and substantially non-resilient article of manufacture which comprises a non-fibrous body of wax and a pressure-sensitive adhesive for engagement with a surface to fasten the body in predetermined position against other bodies, said pressure-sensitive adhesive being in the form of films disposed superficially on two portions of the same surface of said wax body, and said body being substantially impervious to said adhesive and having other surface portions and interior portions substantially free from said adhesive.

7. A relatively soft, readily carved, shape-maintaining, flexible and substantially non-resilient article of manufacture which comprises a non-fibrous sheet of wax of substantially uniform thickness between about 0.005 inch and about one inch, and a pressure-sensitive adhesive for engagement with a surface to fasten the sheet in predetermined position against other bodies, said pressure-sensitive adhesive being in the form of a film disposed superficially on a portion of said wax sheet and said sheet being substantially impervious to said adhesive and having other surface portions and interior portions substantially free from said adhesive.

8. A relatively soft, readily-carved, shape-maintaining, flexible and substantially non-resilient article of manufacture which comprises a non-fibrous body of wax and a pressure-sensitive adhesive for engagement with a surface to fasten the body in predetermined position against other bodies, said pressure-sensitive adhesive being in the form of films disposed superficially on two portions of the same surface of said wax body, and a fibrous layer of flexible material overlying each of the deposits of adhesive and serving as a temporary mask for the assembly, and said body being substantially impervious to said adhesive and having other surface portions and interior portions substantially free from said adhesive.

9. A relatively soft, readily-carved, shape-maintaining, flexible and substantially non-resilient article of manufacture which is completely fusible at temperatures substantially above room temperature and below about 400° F. and which comprises a non-fibrous body of wax and a pressure-sensitive adhesive for engagement with a surface to fasten the body in predetermined position against other bodies, said pressure-sensitive adhesive being in the form of a film disposed superficially on two portions of the same surface of said wax body, and said body being substantially impervious to said adhesive and having other surface portions and interior portions substantially free from said adhesive.

References Cited in the file of this patent

UNITED STATES PATENTS

| | | |
|---|---|---|
| 1,656,647 | Regenstein | Jan. 17, 1928 |
| 2,395,419 | Mitchell | Feb. 26, 1946 |
| 2,532,011 | Dahlquist et al. | Nov. 28, 1950 |
| 2,596,546 | Grimes | May 13, 1952 |
| 2,656,297 | Davis et al. | Oct. 20, 1953 |